US008902764B2

(12) United States Patent
Imai et al.

(10) Patent No.: US 8,902,764 B2
(45) Date of Patent: Dec. 2, 2014

(54) BASE STATION DEVICE, TERMINAL DEVICE, AND CLOSED LOOP CONTROL METHOD

(75) Inventors: Tomohiro Imai, Kanagawa (JP); Shozo Okasaka, Tokyo (JP); Katsuhiko Hiramatsu, Leuven (BE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 1018 days.

(21) Appl. No.: 12/521,514

(22) PCT Filed: Dec. 27, 2007

(86) PCT No.: PCT/JP2007/075087
§ 371 (c)(1),
(2), (4) Date: Jun. 26, 2009

(87) PCT Pub. No.: WO2008/081857
PCT Pub. Date: Jul. 10, 2008

(65) Prior Publication Data
US 2010/0315962 A1 Dec. 16, 2010

(30) Foreign Application Priority Data

Dec. 28, 2006 (JP) ................................. 2006-355342

(51) Int. Cl.
*H04L 5/00* (2006.01)
*H04B 7/26* (2006.01)
*H04L 1/00* (2006.01)
*H04L 25/02* (2006.01)

(52) U.S. Cl.
CPC ............ *H04L 5/0053* (2013.01); *H04B 7/2615* (2013.01); *H04L 1/0015* (2013.01); *H04L 1/0029* (2013.01); *H04L 5/0051* (2013.01); *H04L 25/023* (2013.01)
USPC ....................................................... 370/252

(58) Field of Classification Search
CPC ... H04L 1/0015; H04L 1/0029; H04L 25/023; H04L 5/0051; H04L 5/0053; H04B 7/2615
USPC ......................................................... 370/252
See application file for complete search history.

(56) References Cited

U.S. PATENT DOCUMENTS 7,436,801 B1 * 10/2008 Kanterakis .................... 370/329
2005/0265290 A1 * 12/2005 Hochwald et al. ............ 370/335

(Continued)

FOREIGN PATENT DOCUMENTS

JP         09-261761      10/1997
JP         2005-341297    12/2005

(Continued)

OTHER PUBLICATIONS

Russian Office Action dated Jan. 27, 2011 with English Translation.

(Continued)

*Primary Examiner* — Jason Mattis
*Assistant Examiner* — Stephen J Clawson
(74) *Attorney, Agent, or Firm* — Dickinson Wright PLLC

(57) ABSTRACT

Provided is a base station device capable of reducing a DL-CSI feedback amount in a TDD type radio communication system in which a DL bandwidth is different from a UL bandwidth. In this device, a demultiplexing unit (133) separates an UL pilot, a DL-CQI, and a DL-CSI fed back from a plurality of UEs as communication partners; a channel estimation unit (134) performs channel sounding by using a UL pilot from a UE in which a DL channel and a UL channel are allocated by overlapping a part of the bandwidth so as to obtain UL-CSI; a control DL-CSI acquisition unit (135) performs interpolation of DL-CSI by using the DL-CSI of some RB contained in the bandwidth where the DL channel and the UL channel fed back from the UE are not overlapped; and a DL close loop control unit (104) combines the estimated UL-CSI and the interpolated DL-CSI so as to use them as DL-CSI for controlling the DL close loop.

5 Claims, 12 Drawing Sheets

(56) References Cited

U.S. PATENT DOCUMENTS

| | | |
|---|---|---|
| 2005/0282574 A1 | 12/2005 | Li |
| 2006/0056532 A1* | 3/2006 | Li et al. .................. 375/267 |
| 2006/0274712 A1* | 12/2006 | Malladi et al. ............ 370/345 |
| 2008/0151788 A1* | 6/2008 | Gormley .................. 370/280 |
| 2010/0020704 A1* | 1/2010 | Hu et al. .................. 370/252 |
| 2011/0075587 A1* | 3/2011 | Wu et al. .................. 370/252 |

FOREIGN PATENT DOCUMENTS

| | | |
|---|---|---|
| JP | 2006-514516 | 4/2006 |
| WO | 95/09511 | 4/1995 |
| WO | 2005/062489 | 7/2005 |

OTHER PUBLICATIONS

3GPP RAN WG1 #44 "Uplink sounding for obtaining MIMO channel information at Node B in E-UTRA," Agenda item: 13.1.2, Document for: Discussion, Feb. 2006, pp. 1-6.

International Search Report dated Mar. 25, 2008 with English Translation.

\* cited by examiner

BASE STATION DEVICE, TERMINAL DEVICE, AND CLOSED LOOP CONTROL METHOD

TECHNICAL FIELD

The present invention relates to a base station apparatus, a terminal apparatus and a closed-loop controlling method used in a TDD (Time Division Duplex) communication system.

BACKGROUND ART

Requirements in the system of the fourth generation mobile communication (hereinafter "4G") include use of maximum 100 MHz bandwidth in DL (i.e. downlink) to realize 1 Gbps or more in stationary environment and 100 Mbps or more in moving environment and use of maximum 40 MHz bandwidth in UL (i.e. uplink) to realize 300 Mbps or more in stationary environment and 20 Mbps or more in moving environment.

Besides the TDD scheme, the FDD (Frequency Division Duplex) scheme also provides a duplex method to realize the above high-rate transmission, and these schemes can be compared as follows. In the TDD scheme, DL transmission and UL transmission are switched in the same frequency band according to time, so that guard time is necessary to prevent interference between DL transmission and UL transmission. By contrast with this, with the FDD scheme, DL transmission and UL transmission are carried out in different frequency bands, and therefore guard time is not necessary to prevent interference between DL transmission and UL transmission. The FDD scheme is superior to the TDD scheme with regards to adjacent channel interference and latency.

On the other hand, with the TDD scheme, the same device is used for transmission and reception, so that the cost of hardware is cheaper than in the FDD scheme. Further, with the FDD scheme, the DL channel or UL channel to allocate to each UE (i.e. User Equipment) is fixed per UE. However, with the TDD scheme, it is possible to allocate the DL channel and UL channel dynamically per UE according to the amount of traffic. Further, with the TDD scheme, DL transmission and UL transmission are carried out in the same frequency band, that is, the DL band and the UL band are symmetrical in the TDD scheme, so that, in the TDD MIMO (Multi-Input-Multi-Output) system, it is possible to estimate the DL-CSI (Down Link-Channel State Information) that is necessary for DL closed-loop control, in the base station (BS) side without feedback from the UE. Here, "DL-CSI" refers to information about the amplitude fluctuation and phase fluctuation, which a signal has influence from a channel path when the base station transmits a signal to a terminal and is used for DL closed-loop control processing. To be more specific, the base station apparatus performs UL channel sounding using a UL pilot from the UE, based on the channel reciprocity between DL and UL, to estimate UL-CSI, and, assigns the estimated UL-CSI as DL-CSI for DL closed-loop control. In this way, with the TDD scheme, DL closed-loop control can be realized while suppressing the amount of feedback from the UE, so that it is possible to realize improved system throughput and transmission rates.

FIG. 1 shows how the DL channel and UL channel are allocated to each UE symmetrically in a TDD communication system.

FIG. 1 shows a case as an example where the DL bandwidth and the UL bandwidth are 20 MHz alike, and where the DL channel and UL channel are allocated to five UEs, that is, allocated to UE 1 to UE 5. As shown in FIG. 1, in a TDD communication system, the DL channel and UL channel are the same between UEs, that is, symmetrical. In a TDD communication system, DL transmission and UL transmission are switched in time and guard time is provided so that DL transmission and UL transmission do not interfere transmission each other. Based on the reciprocity between DL-CSI and UL-CSI, when the base station apparatus performs UL channel sounding using a received UL pilot, DL-CSI can be acquired. According to this channel sounding, it is possible to perform DL closed-loop control including transmission power control and beam forming without feeding back DL channel state information (see Non-Patent Document 1).

Non-patent Document 1: 3GPP RAN WG1 #44 Denver, USA, Feb. 13-17, 2006 "Uplink sounding for obtaining MIMO channel information at Node B in E-UTRA 13.1.2."

DISCLOSURE OF INVENTION

Problems to be Solved by the Invention

However, in 4G systems, it is assumed that DL bandwidth is 100 MHz at maximum and UL bandwidth is 40 MHz at maximum as described above, and therefore, the DL channel and UL channel allocated to each UE for DL transmission and UL transmission are asymmetrical in TDD 4G systems. Consequently, there are problems that the reciprocity between DL-CSI and UL-CSI cannot be secured and DL closed-loop control cannot be performed by UL channel sounding.

FIG. 2 shows how the DL channel and UL channel are allocated to each UE asymmetrically in a TDD communication system.

FIG. 2 shows a case as an example where the DL bandwidth and the UL bandwidth are 100 MHz and 40 MHz, respectively, and the DL channel and UL channel are allocated to five UEs, that is, allocated to UE 1 to UE 5. As shown in FIG. 2, the UL bandwidth is more limited than the DL bandwidth, and so different bands are allocated to UE 1, UE 2 and UE 5 as the DL channel and UL channel, and therefore, the reciprocity between DL-CSI and UL-CIS is not secured. Although the DL channel and the UL channel are allocated to UE 3 and UE 4 such that the bands overlap and the reciprocity between DL-CSI and UL-CIS is secured, the DL channel and the UL channel do not match completely. In this TDD system, desired DL channel state information cannot be necessary acquired even if UL channel sounding is performed, and DL channel state information for DL closed-loop control has to be fed back. Consequently, there is a problem that TDD radio communication system throughput decreases and transmission rate decreases. 4G system offers no solution to this problem that TDD communication system where DL channel and UL channel are asymmetrical has.

It is therefore an object of the present invention to provide a base station apparatus, a terminal apparatus and a closed-loop control method that can realize improved system throughput and transmission rates while suppressing the amount of feedback information even in a TDD radio communication system where the DL channel and the UL channel are asymmetrical.

Means for Solving the Problem

The base station apparatus of the present invention provides a base station apparatus used in a time division duplex radio communication system in which a downlink bandwidth and an uplink bandwidth are different, and adopts a configuration including: a receiving section that receives downlink channel state information from a plurality of terminal apparatuses; a channel estimation section that performs channel sounding using a pilot from a specific terminal apparatus, in the plurality of terminal apparatuses, to which a downlink channel and an uplink channel are allocated such that bands partly overlap, to estimate uplink channel state information, and, assigns the estimated uplink channel state information as first downlink channel state information for closed loop control; an interpolation section that assigns downlink channel state information interpolated using downlink channel state information in a first partial band included in a band in which the downlink channel and the uplink channel allocated to the specific terminal apparatus do not overlap, as second downlink channel state information for the closed loop control; and a control section that performs downlink closed loop control processing using the first downlink channel state information and the second downlink channel state information.

The terminal station apparatus of the present invention provides a terminal apparatus used in a time division duplex radio communication system in which a downlink bandwidth and an uplink bandwidth are different, and adopts a configuration including: a selection section that selects part of bands when a downlink channel and an uplink channel are allocated to the terminal apparatus such that bands overlap and a base station apparatus transmits request information about downlink channel state information to the terminal apparatus; a feedback section that feeds back the downlink channel state information in the part of the bands to the base station apparatus.

The closed loop control method of the present invention provides a closed loop control method used in a time division duplex radio communication system in which a downlink bandwidth and an uplink bandwidth are different and includes the method performing downlink closed loop control for a terminal apparatus, in a plurality of terminal apparatuses, assigned a downlink channel and an uplink channel such that bands partly overlap, the downlink closed loop control being performed in a time division duplex scheme in a band in which a downlink channel and an uplink channel overlap; and the downlink closed loop control being performed in a frequency division duplex scheme in a band in which the downlink channel and the uplink channel do not overlap.

Advantageous Effect of the Invention

According to the present invention, even in a TDD radio communication system where the DL channel and the UL channel are asymmetrical, it is possible to realize improved system throughput and transmission rates while suppressing the amount of feedback information.

BEST MODE FOR CARRYING OUT THE INVENTION

Now, embodiments of the present invention will be described in detail with reference to the accompanying drawings.

(Embodiment 1)

Figure 1:
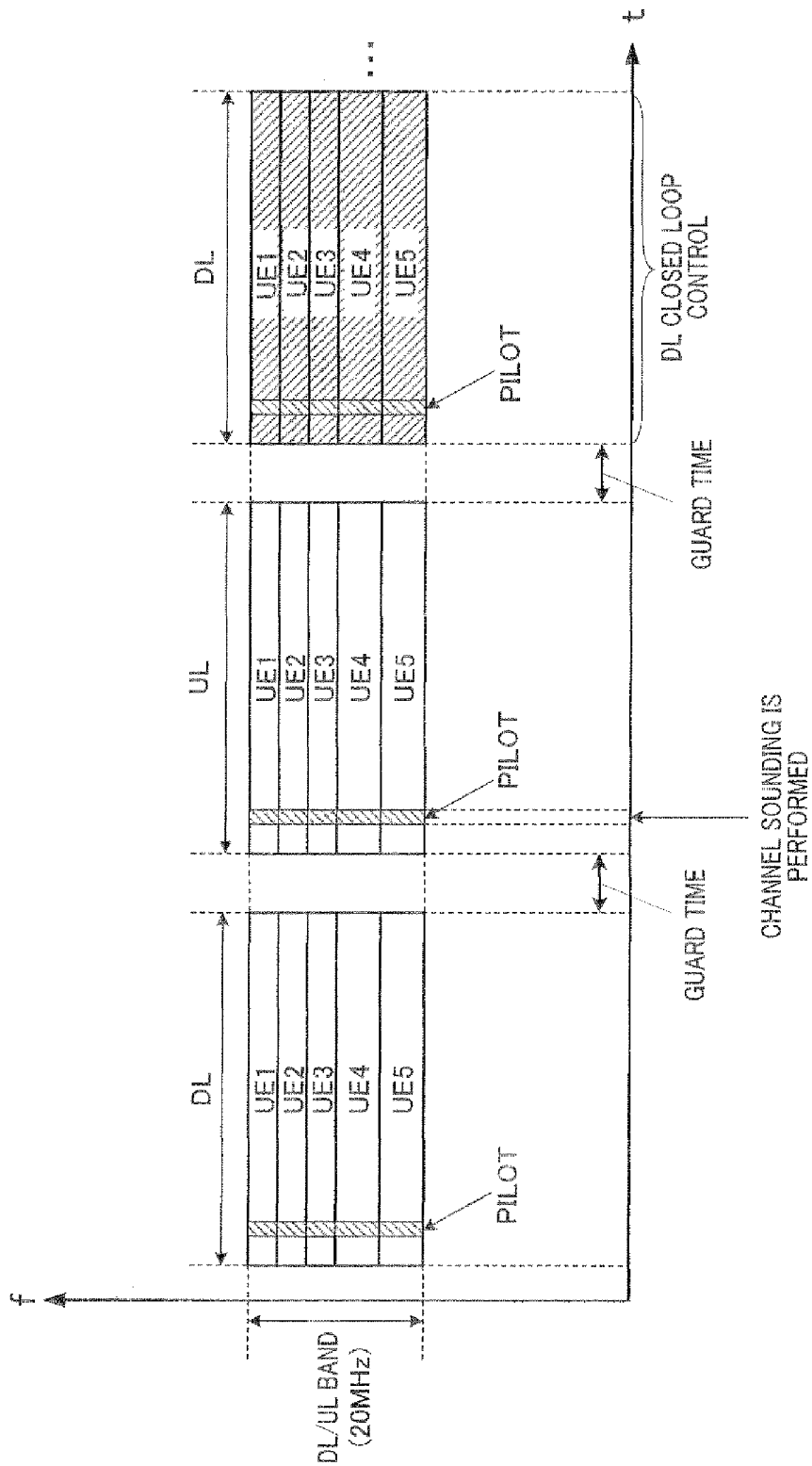
FIG. 1 shows how a DL channel and a UL channel are allocated to each UE symmetrically in a conventional TDD communication system.
Figure 2:
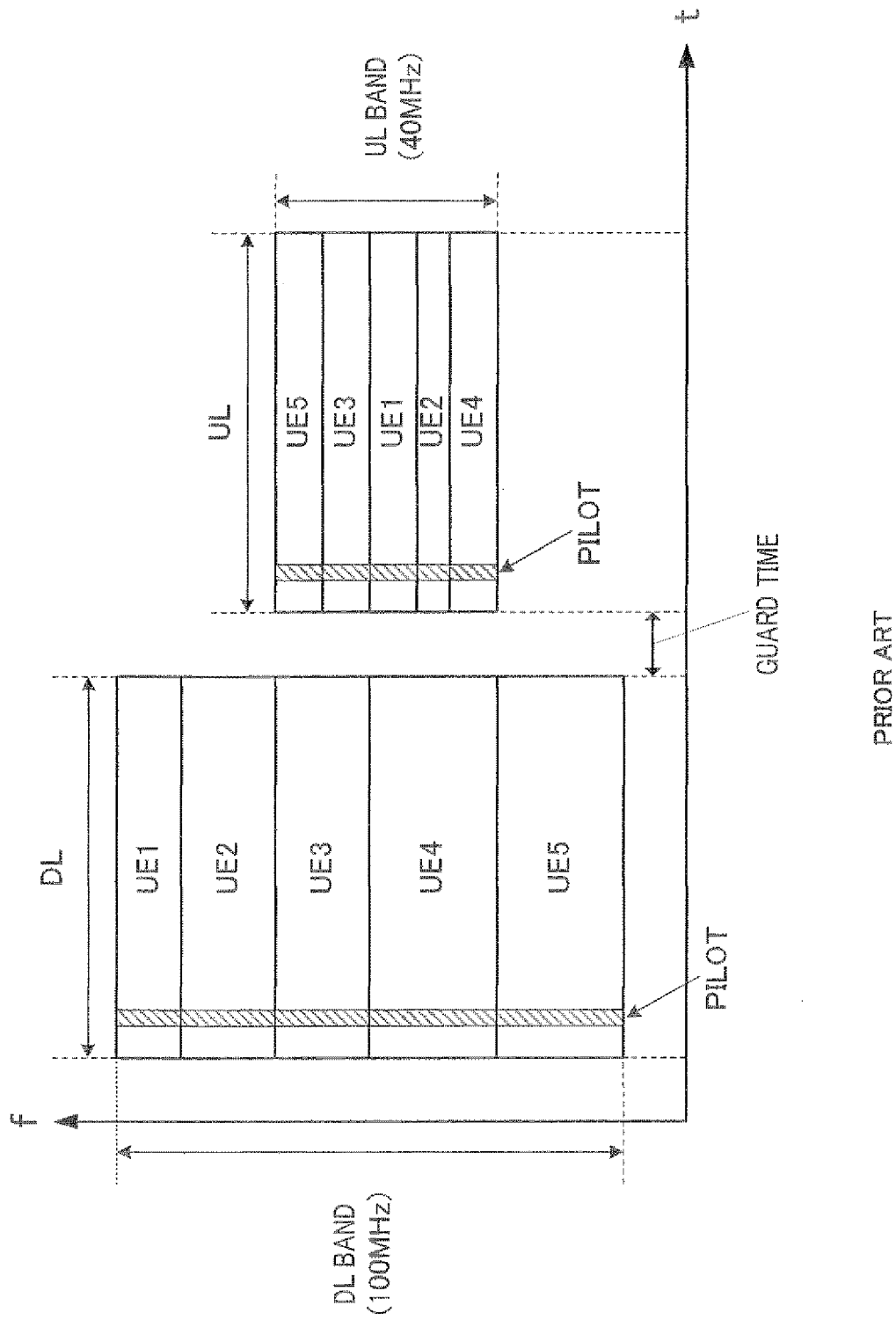
FIG. 2 shows how the DL channel and UL channel are allocated to each UE asymmetrically in a conventional TDD communication system.
Figure 3:
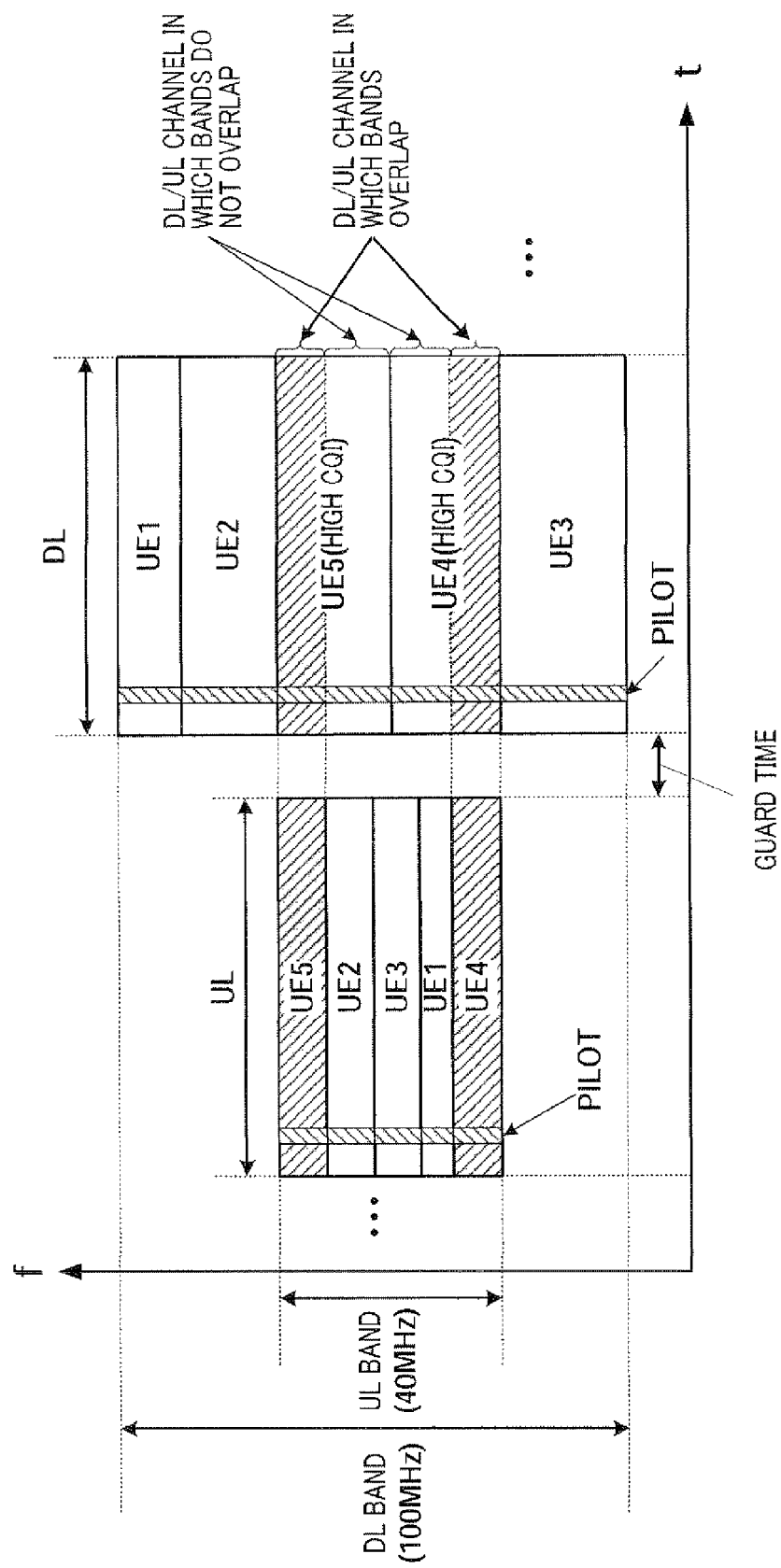
FIG. 3 is an illustration provided to explain the DL/UL channel allocation method in a TDD radio communication system according to Embodiment 1 of the present invention.

FIG. 3 is an illustration provided to explain the DL/UL channel allocation method in a TDD radio communication system according to Embodiment 1 of the present invention.

FIG. 3 shows a case as an example where the DL bandwidth and the UL bandwidth are 100 MHz and 40 MHz, respectively, and where the DL channel and UL channel are allocated to five UEs, that is, allocated to UE 1 to UE 5. Referring to FIG. 3, in the TDD radio communication system according to the present embodiment, throughput is expected to improve by DL closed-loop control for users like UE 4 and UE 5 of a high DL-CQI (Channel Quality Indicator), and the DL channel and UL channel are allocated such that the bands partly overlap. By this means, UL channel sounding is possible. Here, the DL-CQI refers to a parameter showing the received quality of the DL channel and is used in adaptive modulation and channel allocation. The DL bandwidth and the UL bandwidth are different, and therefore there are bands not overlapping in the DL channel and UL channel allocated in UE 4 and UE 5 shown in FIG. 3. Further, the traffic is asymmetrical, and therefore bands cannot be allocated to all UEs symmetrically. That is, the DL channel and UL channel are allocated to UE 1 to UE 3 without making the bands overlap. Then, DL closed-loop control is not subject to these UEs.

Figure 4:
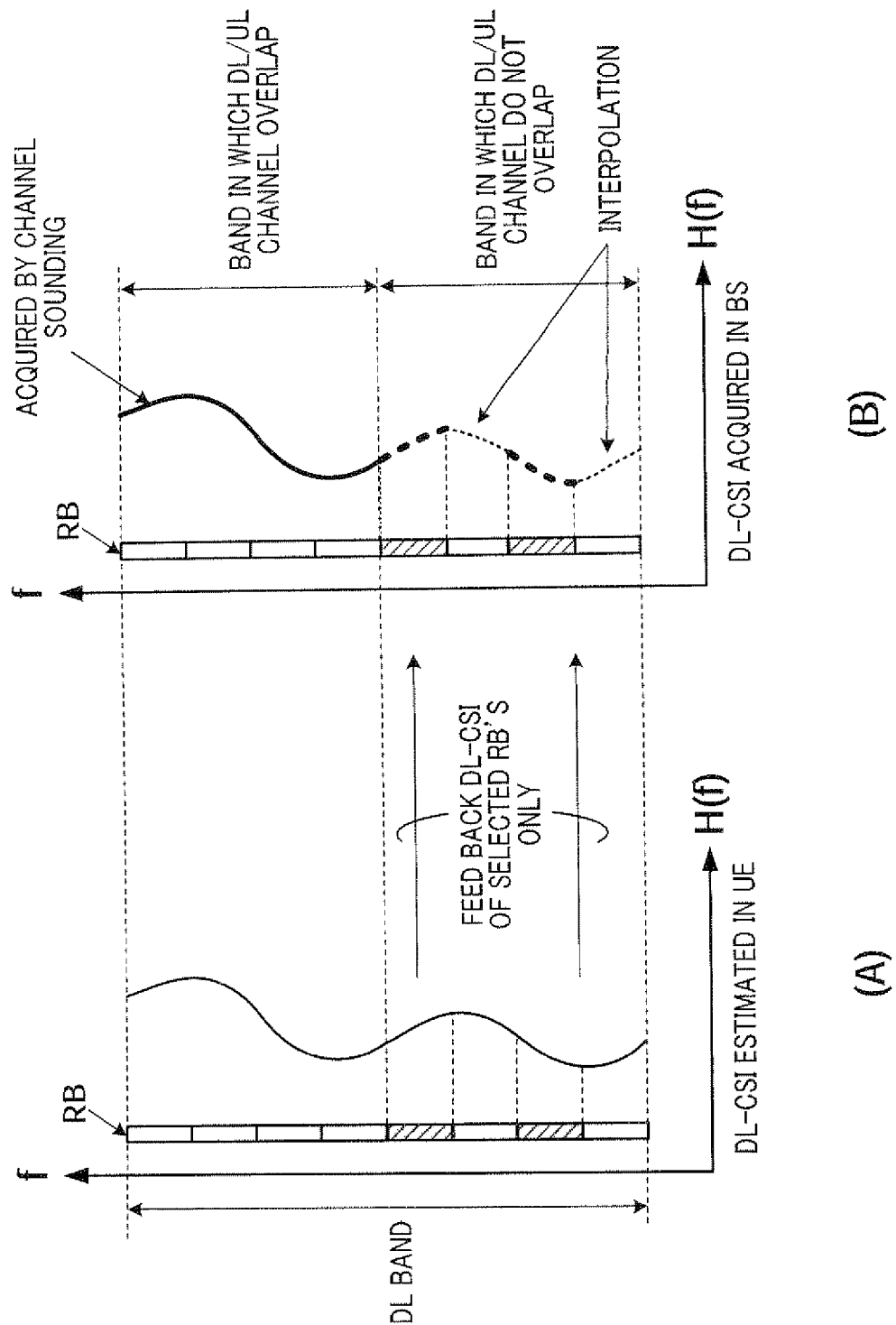
FIG. 4 is an illustration provided to explain a method for acquiring DL-CSI for DL closed-loop control in the base station according to Embodiment 1 of the present invention.

FIG. 4 is an illustration provided to explain a method for acquiring DL-CSI for DL closed-loop control in the base station according to the present embodiment. The DL closed-loop control in FIG. 4 is provided for UEs to which the DL channel and UL channel are allocated such that the bands partly overlap, and is explained using UE 4 as an example.

FIG. 4 shows a plurality of RBs dividing the DL band and the UL band, and the DL-CSI represents in H(f) function. FIG. 4 (A) shows the DL-CSI acquired by channel estimation in UE 4 using a DL pilot transmitted from the base station.

FIG. 4 (B) shows the DL-CSI for DL closed-loop control acquired by channel sounding and interpolation in the base station. To be more specific, in the band where the DL channel and the UL channel overlap, the base station assigns the UL-CSI acquired by UL channel sounding using the UL pilot from UE 4, as the DL-CSI for DL closed-loop control. Meanwhile, in the band where the DL channel and UL channel allocated to UE 4 do not overlap, the base station apparatus requests UE 4 to feed back DL-CSI for part of the RBs, and, based on the partial DL-CSI that is fed back, interpolates the DL-CSI in the RBs where DL-CSI is not fed back. The base station apparatus assigns the partial DL-CSI and the DL-CSI acquired by interpolation, as DL-CSI for DL closed-loop control.

Figure 5:
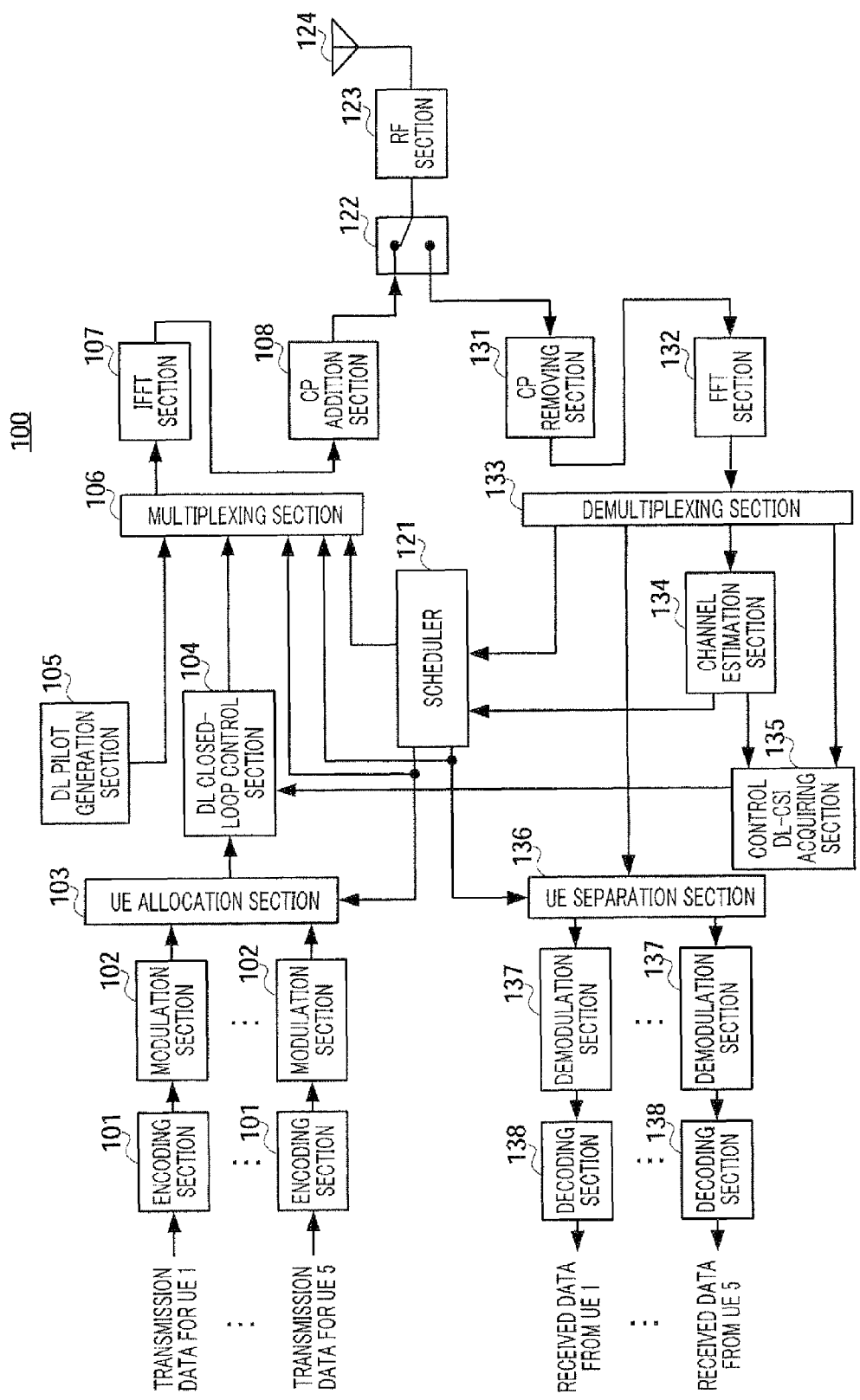
FIG. 5 is a block diagram showing the main configuration of the base station apparatus according to Embodiment 1 of the present invention.

FIG. 5 is a block diagram showing the main configuration of base station apparatus 100 according to present embodiment. A case will be explained with an example here where base station apparatus 100 communicates with five UEs, that is, UE 1 to UE 5, and, in this case, base station apparatus 100 allocates the DL channel and UL channel to the UEs with the method shown in FIG. 3, and acquires DL-CSI for DL closed-loop control with the method shown in FIG. 4.

In FIG. 5, base station apparatus 100 each has the same number of encoding sections 101, modulation sections 102, demodulation sections 137 and decoding sections 138 as the number of UEs of communicating parties, that is, five.

Encoding sections 101 and modulation sections 102 encode and modulate transmission data for the UEs, and outputs the resulting modulated signals to UE allocation section 103.

UE allocation section 103 maps the modulated signals for UEs received as input from modulation sections 102, to DL channels allocated for the UEs using DL allocation information received as input from scheduler 121 (described later), and outputs the resulting DL data signals to DL closed-loop control section 104. The UE allocation result based on DL allocation information received as input from scheduler 121 is shown as FIG. 3, that is, the bands where the DL channel and the UL channel are allocated to UE 4 and UE 5 partly overlap.

Using DL-CSI information for DL closed-loop control received as input from control DL-CSI acquiring section 135 (described later), DL closed-loop control section 104 performs closed-loop control processing including transmission power control and beam forming for the DL data signal received as input from UE allocation section 103, and outputs the DL data signal after closed-loop processing to multiplexing section 106. To be more specific, DL closed-loop control is not subject to UE 1, UE 2 and UE 3 to which the DL channel and the UL channel in different bands are allocated, and is subject to UE 4 and UE 5 to which the bands are allocated such that the bands partly overlap.

DL pilot generation section 105 generates a DL pilot, and outputs the DL pilot to multiplexing section 106.

Multiplexing section 106 multiplexes the DL pilot received as input from DL pilot generation section 105, the DL data signal subjected to closed-loop control processing in DL closed-loop control section 104, DL allocation information, UL allocation information and DL-CSI requesting information received as input from scheduler 121, and outputs the resulting multiplexed signal to IFFT (Inverse Fast Fourier Transform) section 107.

IFFT section 107 performs an IFFT on the multiplexed signal received as input from multiplexing section 106, and outputs the resulting time domain multiplexed signal to CP (Cyclic Prefix) addition section 108.

CP addition section 108 adds the tail part of the time domain multiplexed signal received as input from IFFT section 107 to the head of the multiplexed signal as a CP, and outputs the multiplexed signal with a CP to switch 122.

When base station apparatus 100 operates transmission, switch 122 outputs the time domain multiplexed signal with a CP in CP addition section 108 to RF (Radio Frequency) section 123, and, when base station apparatus 100 operates reception, switch 122 outputs a received signal received as input from RF section 123 to CP removing section 131.

When base station apparatus 100 operates transmission, RF section 123 performs radio processing including up-conversion and A/D conversion on the time domain multiplexed signal received as input from switch 122, and transmits the resulting transmission signal via antenna 124. Meanwhile, when base station apparatus 100 operates reception, RF section 123 performs radio processing including down-conversion and D/A conversion on a received signal received via antenna 124 and outputs the received signal to switch 122.

CP removing section 131 removes the CP added to the head of the received signal received as input from switch 122, and outputs the received signal without a CP to FFT (Fast Fourier Transform) section 132.

FFT section 132 performs an FFT on the received signal without a CP in CP removing section 131, and outputs the frequency domain received signal to demultiplexing section 133.

demultiplexing section 133 demultiplexer (performs inverse multiplexing processing) the frequency domain received signal acquired in FFT section 132, to acquire a DL-CQI, a UL data signal, a UL pilot and DL-CSI. Then, demultiplexing section 133 outputs the DL-CQI to scheduler 121, outputs the UL data signal to UE separation section 136, outputs the UL pilot to channel estimation section 134 and outputs the DL-CSI to control DL-CSI acquiring section 135. Here, the DL-CSI is DL-CSI for part of the RBs fed back from UE 4 and UE 5.

Channel estimation section 134 performs channel estimation, that is, channel sounding, using the UL pilot received as input from demultiplexing section 133, and outputs the resulting UL-CQI and UL-CSI to scheduler 121 and control DL-CSI acquiring section 135, respectively.

Scheduler 121 generates DL allocation information, UL allocation information and DL-CSI requesting information using the DL-CQI received as input from demultiplexing section 133 and the UL-CQI received as input from channel estimation section 134. Scheduling information 121 will be described later in detail.

Control DL-CSI acquiring section 135 generates DL-CSI for DL closed-loop control for UE4 and UE5 using the UL-CSI received as input from channel estimation section 134 and the DL-CSI received as input from demultiplexing section 133, and outputs the generated DL-CSI for DL closed-loop control to DL closed-loop control section 104. To be more specific, as shown in FIG. 4, in the band where the DL channel and UL channel allocated to UE 4 or UE 5 overlap, control DL-CSI acquiring section 135 acquires UL-CSI by UL channel sounding in channel estimation section 134. In the band where the DL channel and UL channel allocated to UE 4 or UE 5 do not overlap, control DL-CSI acquiring section 135 performs interpolation using the DL-CSI for part of the RBs received as input from demultiplexing section 133 and acquires DL-CSI in the RBs where DL-CSI is not fed back. Control DL-CSI acquiring section 135 puts together the UL-CSI acquired by UL channel sounding, the DL-CSI fed back from UE 4 or UE 5 and interpolated DL-CSI, to output it as the DL-CSI for DL closed-loop control.

UE separation section 136 separates the UL data signal received as input from demultiplexing section 133 into data signals corresponding to the UEs using UL allocation information received as input from scheduler 121.

Demodulation sections 137 and decoding sections 138 demodulate and decode the data signals corresponding to the UEs, received as input from UE separation section 136, to acquire received data from the UEs.

Figure 6:
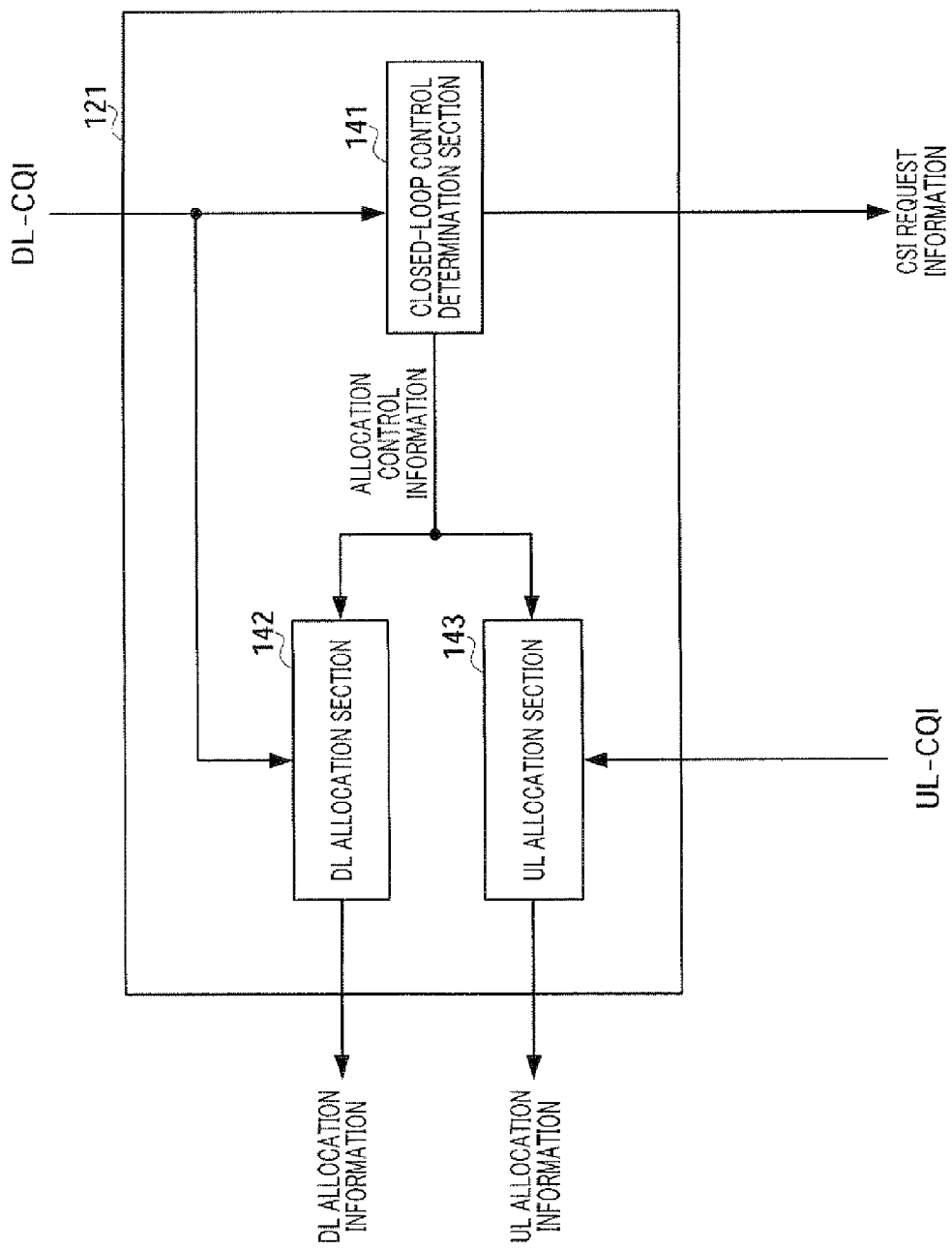
FIG. 6 is a block diagram showing the main configuration inside the scheduler according to Embodiment 1 of the present invention.

FIG. 6 is a block diagram showing the main configuration inside scheduler 121.

Closed-loop control determination section 141 decides levels of the DL-CQIs of UEs received as input from demultiplexing section 133, determines that DL closed-loop control is possible for UEs where the DL-CQI level is equal to or more than a predetermined level (e.g. UE 4 and UE 5 shown in FIG. 3) and outputs DL-CSI requesting information to multiplexing section 106. Further, closed-loop control determination section 141 outputs allocation control information, which shows the DL/UL channel allocation such that the bands for UE 4 and UE 5 partly overlap, to DL allocation section 142 and UL allocation section 143.

DL allocation section 142 allocates the DL channel to the UEs in RB units using the DL-CQI received as input from demultiplexing section 133 and the allocation control information received as input from closed-loop control determination section 141. Further, DL allocation section 142 outputs the DL allocation information that shows which RBs in the DL channel are allocated to which UEs, to UE allocation section 103 and multiplexing section 106.

UL allocation section 143 allocates the UL channel to the UEs in RB units using the UL-CQI received as input from channel estimation section 134 and the allocation control information received as input from closed-loop control determination section 141. Further, UL allocation section 143 outputs the UL allocation information that shows which RBs in the UL channel are allocated to which UEs, to UE separation section 136 and multiplexing section 106.

Figure 7:
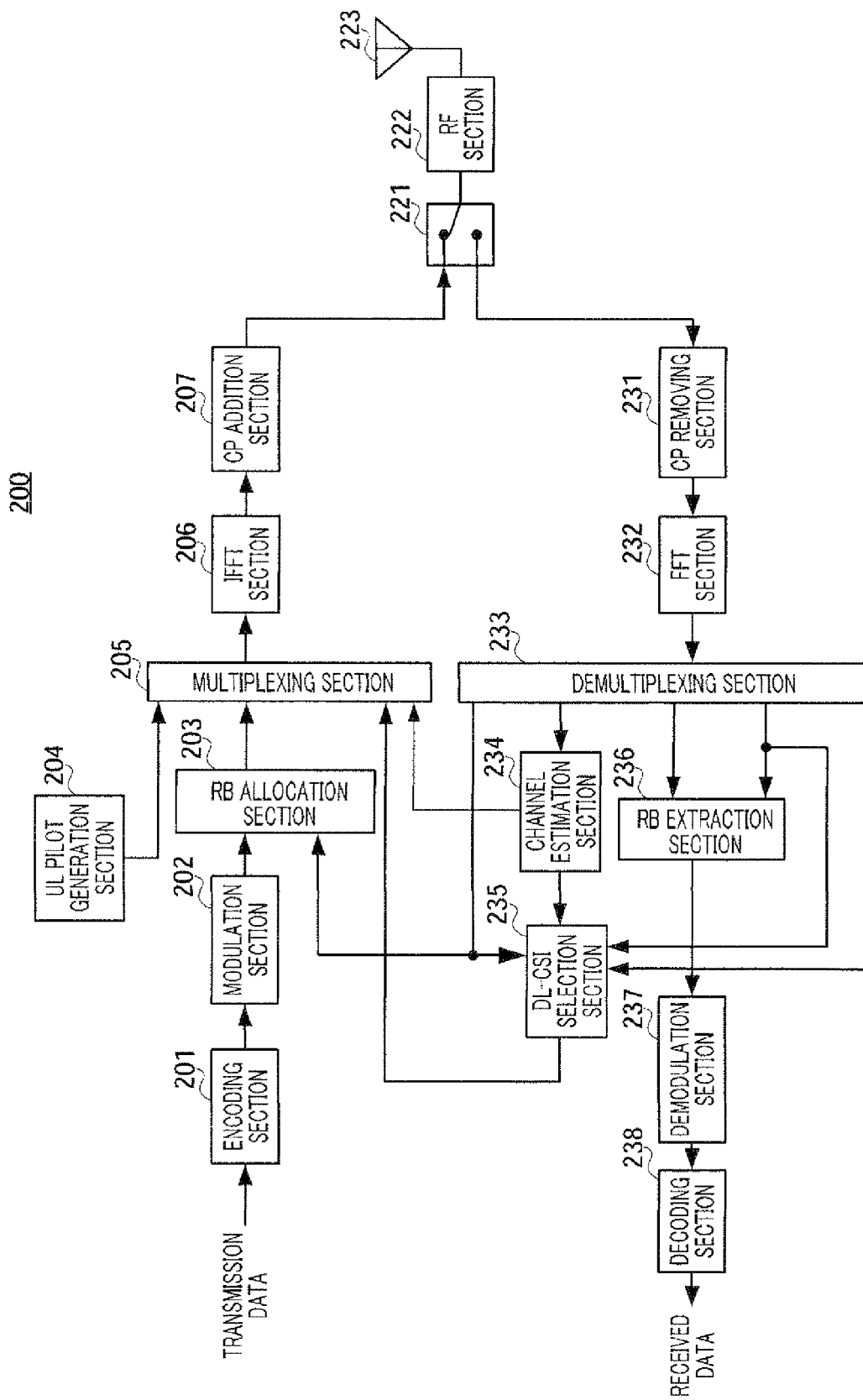
FIG. 7 is a block diagram showing the main configuration of the terminal apparatus according to Embodiment 1 of the present invention.

FIG. 7 is a block diagram showing the main configuration of terminal apparatus 200 used as a UE according to present embodiment.

Encoding section 201 and modulation section 202 encodes and modulates transmission data, and outputs the resulting modulated signal to RB allocation section 203.

RB allocation section 203 allocates the modulated signal received as input from modulation section 202 to RBs in the UL channel based on UL allocation information received as input from demultiplexing section 233, and outputs the resulting RB allocated signal to multiplexing section 205.

UL pilot generation section 204 generates a UL pilot for allocation to the UL channel, and outputs the UL pilot to multiplexing section 205.

Multiplexing section 205 multiplexes the UL pilot received as input from UL pilot generation section 204, the RB allocated signal received as input from RB allocation section 203, the DL-CQI received as input from channel estimation section 234 and the partial DL-CSI received as input from DL-CSI selection section 235, and outputs the resulting multiplexed signal to IFFT section 206.

IFFT section 206 performs an IFFT on the multiplexed signal received as input from multiplexing section 205, and outputs the resulting time domain multiplexed signal to CP addition section 207.

CP addition section 207 adds the tail part of the time domain multiplexed signal received as input from IFFT section 206 to the head of the multiplexed signal as a CP, and outputs the multiplexed signal with a CP to switch 221.

When terminal apparatus 200 operates transmission, switch 221 outputs the time domain multiplexed signal with a CP in CP addition section 207 to RF section 222, and, when terminal apparatus 200 operates reception, switch 221 outputs a received signal received as input from RF section 222 to CP removing section 231.

When terminal apparatus 200 operates transmission, RF section 222 performs radio processing including up-conversion and A/D conversion on the time domain multiplexed signal received as input from switch 221, and transmits the resulting transmission signal via antenna 223. Meanwhile, when terminal apparatus 200 operates reception, RF section 222 performs radio processing including down-conversion and D/A conversion on a received signal received via antenna 223 and outputs the received signal to switch 221.

CP removing section 231 removes the CP added to the head of the received signal received as input from switch 221, and outputs the received signal without a CP to FFT section 232.

FFT section 232 performs an FFT on the received signal without a CP in CP removing section 231, and acquires a frequency domain received signal.

demultiplexing section 233 demultiplexer the frequency domain received signal received as input from FFT section 232, to acquire a data signal, a DL pilot, DL allocation information, UL allocation information and DL-CSI request information. Then, demultiplexing section 233 outputs the DL pilot to channel estimation section 234, outputs the data signal and DL allocation information to RB extraction section 236, outputs the DL allocation information, the UL allocation information, and the DL-CSI request information to DL-CSI selection section 235.

Channel estimation section 234 performs channel estimation using the DL pilot received as input from demultiplexing section 233, and outputs the resulting DL-CQI and the resulting DL-CSI to multiplexing section 205 and DL-CSI selection 235, respectively.

When the CSI requesting information is received as input from demultiplexing section 233, DL-CSI selection section 235 selects RBs based on the DL allocation information and UL allocation information received as input from demultiplexing section 233. Then, DL-CSI selection section 235 outputs the DL-CSI of the selected RBs to multiplexing section 205, among DL-CSI received as input from channel estimation section 234. Here, DL-CSI selection section 235 selects the RBs to feed back DL-CSI such that the accuracy of interpolation upon interpolating DL-CSI in base station apparatus 100 is the highest.

RB extraction section 236 extracts a RB, which is allocated from transmission data from base station apparatus 100, from the data signal received as input from demultiplexing section 233 based on the DL allocation information received as input from demultiplexing section 233, and outputs the extracted RB to demodulation section 237.

Demodulation section 237 and decoding section 238 demodulates and decodes the data signal in the RB extracted in RB extraction section 236, to acquire received data.

Figure 8:
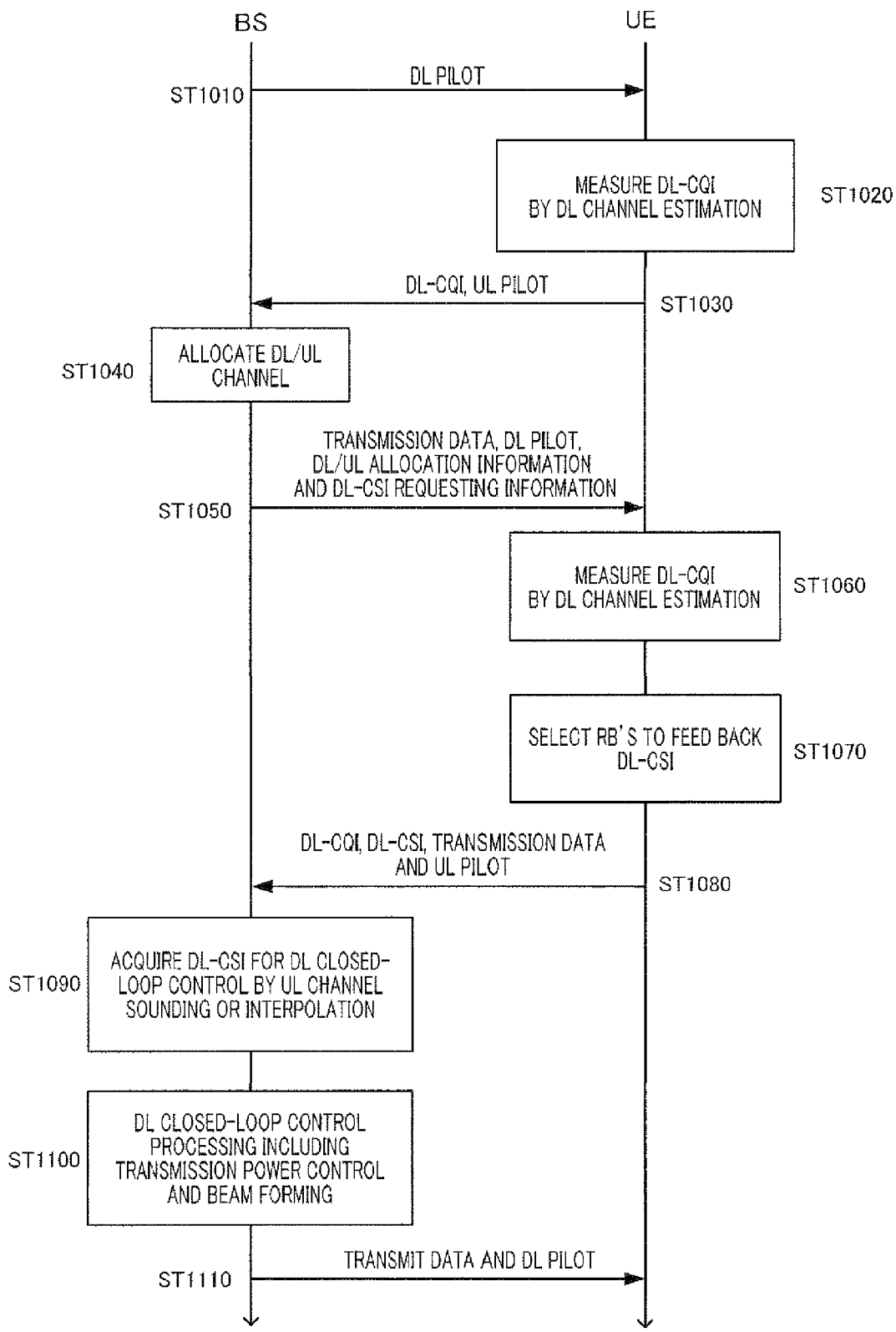
FIG. 8 shows a sequence diagram showing operations according to the DL closed-loop control processing between the base station apparatus and the terminal apparatus according to Embodiment 1 of the present invention.

FIG. 8 shows a sequence diagram showing operations according to DL closed-loop control processing between base station apparatus 100 and terminal apparatus 200. With the description of this sequence diagram, base station apparatus 100 abbreviates to "BS," and terminal apparatus 200 abbreviates to "UE."

First, in step (ST) 1010, the BS allocates each UE to the DL channel, and transmits the DL pilot to each UE.

Next, in ST 1020, each UE performs DL channel estimation using the DL pilot transmitted from the BS, to measure DL-CQI.

Next, in ST 1030, each UE transmits the measured DL-CQI and the UL pilot for UL channel allocation to the ES.

Next, in ST 1040, the BS allocates the DL channel and UL channel to each UE using the DL-CQI and UL pilot fed back from each UE. In this step, as shown in FIG. 3, the BS allocates the DL channel and UL channel to the UEs, for which DL closed-loop control is possible by channel sounding, and which have high DL-CQIs, such that the bands partly overlap.

Next, in ST 1050, the BS transmits the transmission data for a UE, the DL pilot, DL allocation information and UL allocation information to each UE, and further transmits DL-CSI requesting information to the UEs in which DL closed-loop control by channel sounding is possible and which have high DL-CQIs.

Next, in ST 1060, each UE performs channel estimation in DL using the DL pilot transmitted from the BS, to measure DL-CQI.

Next, in ST 1070, only the UEs to which the BS has transmitted DL-CSI requesting information, measure the DL-CSI for closed-loop control, and selects the RBs to feed back DL-CSI such that the effect of interpolation of DL-CSI in the BS is the optimal.

Next, in ST 1080, each UE transmits the DL-CQI, the transmission data and the UL pilot. Further, in this step, the UEs to which the BS has transmitted DL-CSI requesting information, feed back the DL-CSI of the selected RBs to the BS.

Next, in ST 1090, the BS performs DL closed-loop control only for the UEs for which DL closed-loop control is possible. To be more specific, the BS performs channel sounding in bands where the DL channel and UL channel are allocated such that the DL channel and UL channel overlap, to acquire the DL-CSI for DL closed-loop control, and, in the other bands, the BS performs interpolation using partial DL-CSI fed back from UEs, to acquire the DL-CSI for DL closed-loop control.

Next, in ST 1100, the BS performs DL closed-loop control processing including transmission power control and beam forming, using the DL-CSI for DL closed-loop control acquired in ST 1090.

Next, in ST 1110, the BS transmits the DL pilot and the transmission data subjected to closed-loop control processing, to each UE.

In this way, according to the present embodiment, the base station apparatus allocates a DL channel and a UL channel such that bands partly overlap, to terminal apparatuses for which DL closed-loop control is possible, and performs channel sounding using the UL pilot in bands in which the DL channel and the UL channel overlap, to acquire UL-CSI. Further, in a band in which the DL channel and UL channel allocated to terminal apparatuses for which DL closed-loop control is possible do not overlap, the base station apparatus interpolates the DL-CSI of the unselected RBs using the DL-CSI of the selected RBs only, and assigns DL-CSI for DL closed-loop control together with the above UL-CSI. Therefore, the terminal apparatuses for which DL closed-loop control is possible, performs DL closed-loop control in the TDD scheme in bands in which the DL channel and UL channel overlap, and performs DL closed-loop control in the FDD scheme in bands in which the DL channel and the UL channel do not overlap. Consequently, it is possible to reduce the amount of feedback of DL-CSI used in DL closed-loop control and improve system throughput.

Figure 9:
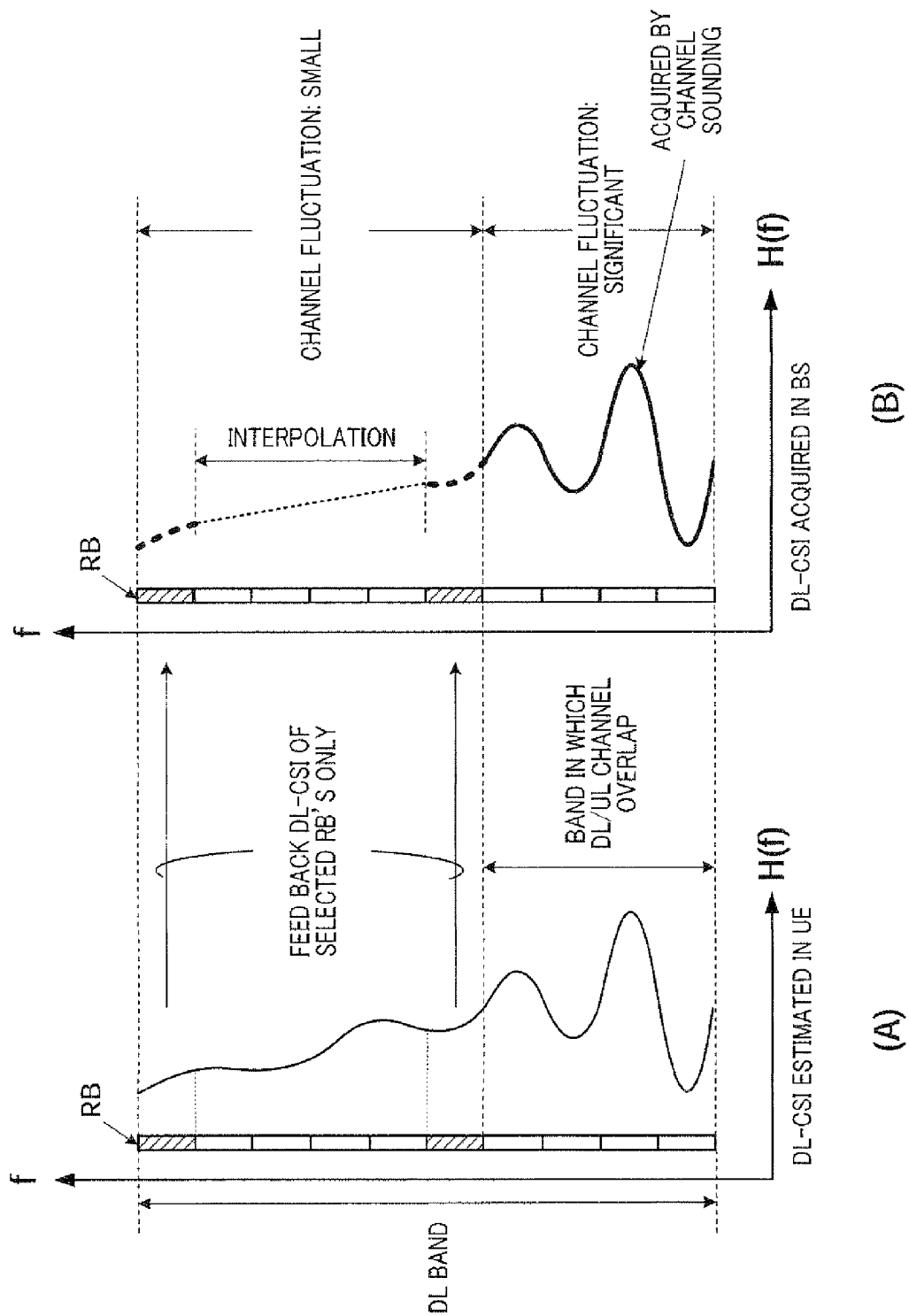
FIG. 9 shows a variation of the DL/UL channel allocation method according to Embodiment 1 of the present invention.

Although a case has been explained with the present embodiment where the DL channel and UL channel are allocated such that bands where DL-CQI is high and where DL closed-loop control is possible by channel sounding overlap, the present invention is not limited to this, and, as shown in FIG. 9, the DL channel and UL channel may be allocated according to channel fluctuation. To be more specific, the base station apparatus may have a measurement section that derives delay spread using delay profiles of channels, to measure channel fluctuation. The base station apparatus allocates the DL channel and UL channel to the bands where the channel fluctuation is equal to or more than a threshold value such that the DL channel and UL channel overlap, and the base station allocates the DL channel and UL channel to the bands where the channel fluctuation is less than the threshold value such that the DL channel and UL channel do not overlap, and, furthermore, may request feedback of the DL-CSI of these bands.

Further, although a case has been explained as an example with the present embodiment where DL closed-loop control processing is subject to each terminal apparatus to which the DL channel and the UL channel are allocated according to the DL-CQI fed back from each terminal apparatus (see FIG. 4) or channel fluctuation (see FIG. 9). However, the present invention is not limited to this, and, DL closed-loop control processing according to the present invention may be performed for each terminal apparatus to which the DL channel and UL channel are allocated in advance.

Further, a case has been explained as an example with the present embodiment where, in bands where DL closed-loop control processing by channel sounding is not possible, the terminal apparatus selects the RBs and feeds back DL-CSI to the base station apparatus. However, the present invention is not limited to this, and, it is equally possible to feed back DL-CSI of all RBs in these bands and change the number of selected RBs adaptively.

(Embodiment 2)

The DL/UL channel allocation method in a TDD radio communication system according to Embodiment 2 of the present invention is the same as the DL/UL channel allocation method (see FIG. 3) shown in Embodiment 1 of the present invention, and therefore, the description thereof will be omitted.

Figure 10:
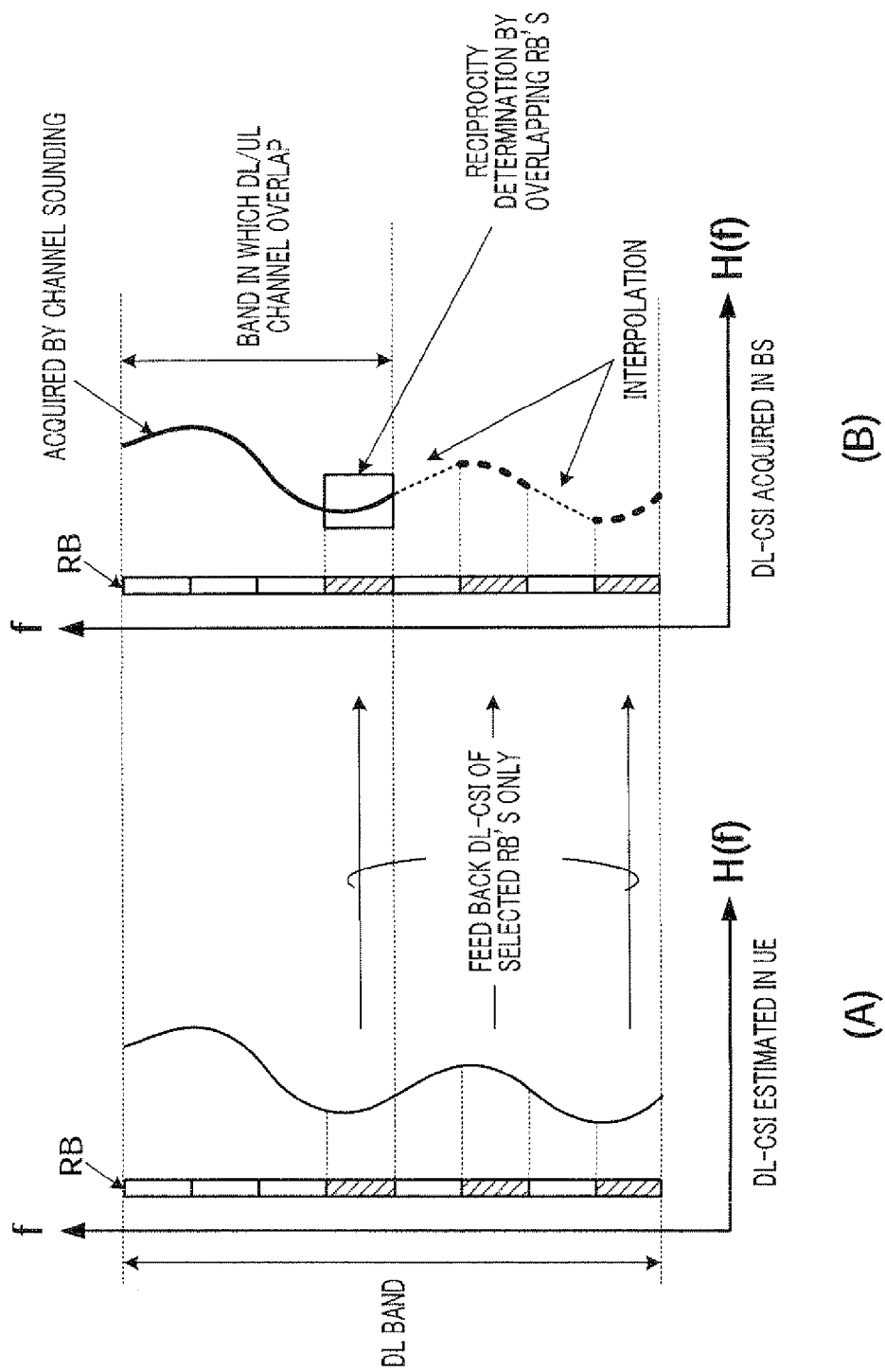
FIG. 10 is an illustration provided to explain how to acquire DL-CSI for DL closed-loop control in the base station according to Embodiment 2 of the present invention.

FIG. 10 is an illustration provided to explain how to acquire DL-CSI for DL closed-loop control in the base station according to the present embodiment. The method of acquiring DL-CSI for DL closed-loop control is basically the same as the method according to Embodiment 1, and therefore, the difference of methods between two embodiments will only be explained.

The method as shown in FIG. 10 is different from the method shown in FIG. 4 in that, upon selecting RBs to feed back the DL-CSI, UE 4 or UE 5 selects RBs (hereinafter "overlapping RBs") including the RBs in which the bands, where the DL channel and the UL channel overlap, and the bands, where the DL channel and the UL channel do not overlap, overlap, and feeds back overlapping RB information showing the selected overlapping RBs to the base station. Further, the base station receiving the DL-CSI of a plurality of RBs including these overlapping RBs as feedback, compares the UL-CSI of the overlapping RBs acquired by channel sounding and the DL-CSI of the overlapping RBs fed back from UE 4 or UE 5, to determine channel reciprocity. When the base station determines that channel reciprocity is established as the comparison result, the base station performs DL closed-loop control processing using the DL-CSI acquired by channel sounding for DL closed-loop control and the DL-CSI acquired by interpolation for DL closed-loop control. When the base station determines that channel reciprocity is not established, the base station performs DL closed-loop control processing using the DL-CSI only acquired by interpolation for DL closed-loop control.

Figure 11:
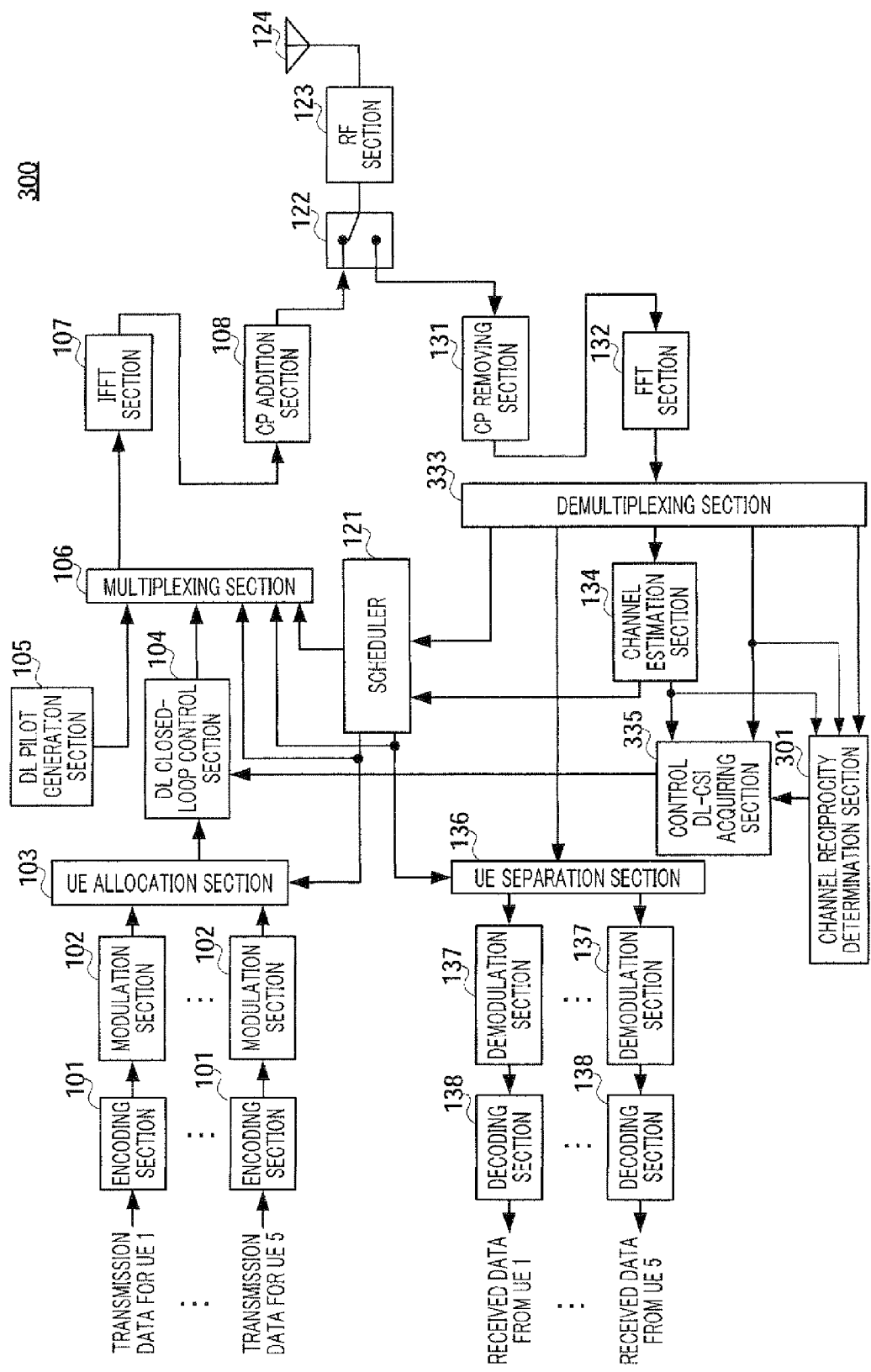
FIG. 11 is a block diagram showing the main configuration of the base station apparatus according to Embodiment 2 of the present invention.

FIG. 11 is a block diagram showing the main configuration of base station apparatus 300 according to present embodiment. Base station apparatus 300 has the same basic configuration as base station apparatus 100 of Embodiment 1 (see FIG. 5), the same reference numerals are assigned to the same components, and therefore the description thereof will be omitted.

Base station apparatus 300 is different from base station apparatus 100 in having channel reciprocity determination section 301 further. demultiplexing section 333 and control DL-CSI acquiring section 335 of base station apparatus 300 are different from demultiplexing section 133 and control DL-CSI acquiring section 135 of base station apparatus 100 in parts of processing, and therefore, to show the differences, different reference numerals are assigned.

Demultiplexing section 333 acquires the overlapping RB information additionally from demultiplexing section 133, by performing demultiplexing processing, and outputs the overlapping RB information to channel reciprocity determination section 301.

Channel reciprocity determination section 301 compares the UL-CSI and the DL-CSI corresponding to the overlapping RBs shown by the overlapping RB information received as input from demultiplexing section 333, in the UL-CSI received as input from channel estimation section 134 and the DL-CSI received as input from demultiplexing section 333, to determine channel reciprocity, and outputs the determination result to control DL-CSI acquiring section 335. To be more specific, if the UL-CSI received as input from channel estimation section 134 represents $H_{UL}(f)$, the DL-CSI received as input from demultiplexing section 333 represents $H_{DL}(f)$, $H_{UL}(f)$ and $H_{DL}(f)$ associated with the RBs shown by the overlapping RB information represent $H_{UL}(f_{OL})$ and $H_{DL}(f_{OL})$, channel reciprocity determination section 301 calculates cross-correlation $\rho$ ($0 \leq \rho \leq 1$) between the DL channel and the UL channel according to the following equation 1.

(Equation 1)

$$\rho = \left| \frac{E[a_{ij}^*(f_{OL}) \cdot b_{ij}(f_{OL})]}{\sqrt{E[|a_{ij}(f_{OL})|^2]} \sqrt{E[|b_{ij}(f_{OL})|^2]}} \right| \quad [1]$$

In this equation, $a_{ij}(f_{OL})$ and $b_{ij}(f_{OL})$ represent the elements of $H_{UL}(f_{OL})$ and $H_{DL}(f_{OL})$, respectively, and E represents the sum of squares function. In the case where calculated cross-correlation $\rho$ is equal to or more than a predetermined threshold value, channel reciprocity determination section 301 outputs to control DL-CSI acquiring section 335 the determination result that channel reciprocity is established, and, in the case where calculated cross-correlation $\rho$ is less than a predetermined threshold value, channel reciprocity determination section 301 outputs to control DL-CSI acquiring section 335 the determination result that channel reciprocity is not established.

Based on the channel reciprocity determination result received as input from channel reciprocity determination section 301, in the case where channel reciprocity is established, control DL-CSI acquiring section 335 outputs the UL-CSI acquired by channel sounding in channel estimation section 134 and the DL-CSI acquired by interpolation, as the DL-CSI for DL closed-loop control to DL closed-loop control section 104. Further, based on the channel reciprocity determination result received as input from channel reciprocity determination section 301, in the case where channel reciprocity is not established, control DL-CSI acquiring section 335 outputs the DL-CSI acquired by interpolation in channel estimation section 134 as the DL-CSI for DL closed-loop control to DL closed-loop control section 104.

The main configuration of the terminal apparatus as the UE according to present embodiment has the same functions and operations as terminal apparatus 200 according to Embodiment 1, and therefore the description thereof will be omitted. The terminal apparatus according to the present embodiment is different from terminal apparatus 200 in selecting RBs including the overlapping RBs in DL-CSI selection section 235 and outputting overlapping RB information to multiplexing section 205.

Figure 12:
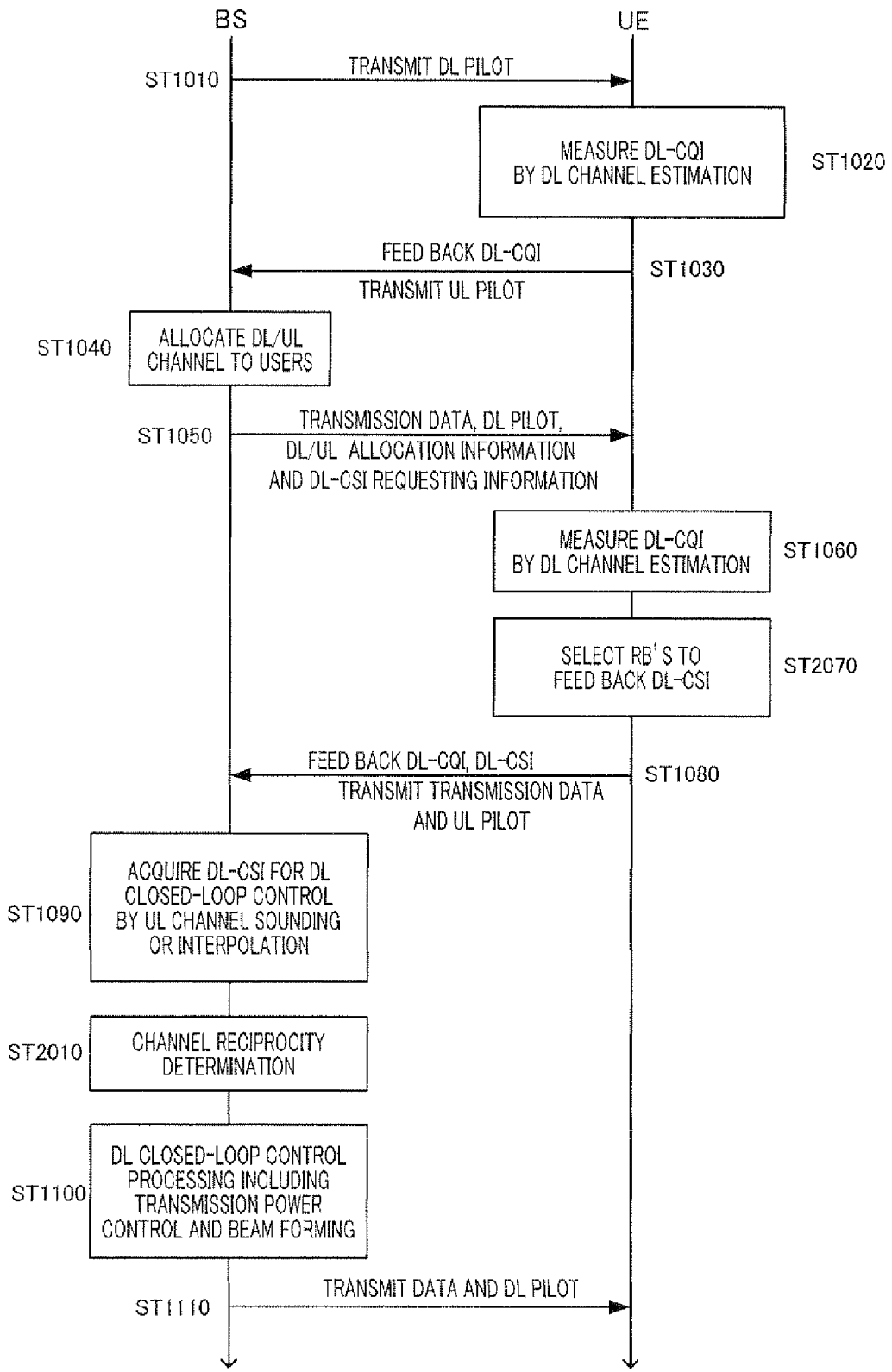
FIG. 12 is a sequence diagram showing the operations of DL closed-loop control processing between the base station apparatus and the terminal apparatus according to Embodiment 2 of the present invention.

FIG. 12 is a sequence diagram showing the operations of DL closed-loop control processing between base station apparatus 300 and terminal apparatus 200. The sequence shown in this figure basically has the same step as the sequence shown in FIG. 8 (see Embodiment 1), and the same reference numerals are assigned to the same steps, and therefore the description thereof will be omitted.

The sequence shown in FIG. 12 is different from the sequence shown in FIG. 8 in having ST 2010 additionally. ST 2070 in the sequence shown in FIG. 12 is different from ST 1070 in the sequence shown in FIG. 8 in parts of the processing, and therefore different reference numerals are assigned to show the differences.

ST 2070 is different from ST 1070 shown in FIG. 8 in that the UE having received the DL-CSI requesting information selects RBs including the overlapping RBs, and generates overlapping RB information that shows the selected overlapping RBs.

In ST 2010, BS calculates the cross-correlation between the UL-CSI of the overlapping RBs acquired by channel sounding and the DL-CSI of the overlapping RBs fed back from the UE, to determine channel reciprocity.

In this way, according to the present embodiment, the base station apparatus calculates the cross-correlation between the UL-CSI of overlapping RBs acquired by channel sounding and the DL-CSI of overlapping RBs fed back from the UE, to determine channel reciprocity. By this means, it is possible to avoid performing DL closed-loop control using DL-CSI acquired by channel sounding in the case where channel reciprocity is not established and reduce the degradation of communication quality.

Although a case has been explained with the present embodiment where, in the case where the channel reciprocity is not established, DL closed-loop control is performed using DL-CSI only acquired by interpolation, the present invention is not limited to this, and, it is not necessary to perform DL closed-loop control in the case where channel reciprocity is not established.

The embodiments of the present invention have been described.

Moreover, although with the above embodiment a case has been described where the present invention is configured by hardware, the present invention may be implemented by software. For example, it is possible to implement the same functions as in the base station apparatus according to the present invention by describing algorithms of the radio transmitting methods according to the present invention using programming languages, and executing this program with an information processing section by storing in memory.

Each function block employed in the explanation of the aforementioned embodiment may typically be implemented as an LSI constituted by an integrated circuit. These may be individual chips or partially or totally contained on a single chip.

"LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology, Application of biotechnology is also possible.

The disclosure of Japanese Patent Application No. 2006-355342, filed on Dec. 28, 2006, including the specification, drawings and abstract, is incorporated herein by reference in its entirety.

Industrial Applicability

The base station apparatus, terminal apparatus, and closed-loop control method of the present invention are applicable to, for example, TDD radio communication systems in which DL channels and UL channel are asymmetrical.

The invention claimed is:

1. A base station apparatus that communicates with a plurality of terminal apparatuses using a time division duplex scheme in which a downlink bandwidth and an uplink bandwidth are different, the base station apparatus comprising:
   an allocation section that allocates a downlink band and an uplink band to a specific terminal apparatus in the plurality of terminal apparatuses, such that a frequency of the allocated uplink band is the same as a frequency of a first part of the allocated downlink band;
   a reception section that receives downlink channel state information (DL-CSI) of a second part of the downlink band other than the first part of the downlink band from the specific terminal apparatus, the received DL-CSI being used as a second DL-CSI for closed loop control processing;
   a request section that transmits, to the specific terminal apparatus, request information for requesting feedback of the DL-CSI of the second part of the allocated downlink band;
   a channel estimation section that performs channel estimation using a pilot signal transmitted on the allocated uplink band from the specific terminal apparatus, to estimate uplink channel state information (UL-CSI), the estimated UL-CSI being used as a first DL-CSI for the closed loop control processing; and
   a control section that performs the closed loop control processing in the allocation section using the first DL-CSI and the second DL-CSI,
   wherein:
   the reception section receives a downlink channel quality indicator (DL-CQI) from the specific terminal apparatus, the DL-CQI being equal to or more than a first threshold value of channel quality.

2. The base station apparatus according to claim 1, further comprising:
   a determination section that calculates cross correlation between the DL-CSI in a first frequency band and the UL-CSI in the first frequency band in the estimated UL-CSI, to determine channel reciprocity, the first frequency band being included in the frequency of the first part of the allocated downlink band, and the DL-CSI in the first frequency band being fed back from the specific terminal,
   wherein, when the cross correlation is equal to or more than a threshold value, the control section performs the closed loop control processing using the first DL-CSI and the second DL-CSI, and, when the cross correlation is less than the threshold value, the control section performs the closed loop control processing using the second DL-CSI only.

3. A base station apparatus that communicates with a plurality of terminal apparatuses using a time division duplex scheme in which a downlink bandwidth and an uplink bandwidth are different, the base station apparatus comprising:
   a measurement section that derives delay spread using a delay profile of a channel, to measure channel fluctuation;
   an allocation section that allocates a downlink band and an uplink band to a specific terminal apparatus in the plurality of terminal apparatuses, such that a frequency of the allocated uplink band is the same as a frequency of a first part of the allocated downlink band;
   a reception section that receives downlink channel state information (DL-CSI) of a second part of the downlink band other than the first part of the downlink band from the specific terminal apparatus, the received DL-CSI being used as a second DL-CSI for closed loop control processing;
   a request section that transmits, to the specific terminal apparatus, request information for requesting feedback of the DL-CSI in the second part of the allocated downlink band, the second part of the downlink band being a band in which the channel fluctuation is smaller than a second threshold value,
   a channel estimation section that performs channel estimation using a pilot signal transmitted on the allocated uplink band from the specific terminal apparatus, to estimate uplink channel state information (UL-CSI), the estimated UL-CSI being used as a first DL-CSI for the closed loop control processing; and
   a control section that performs the closed loop control processing in the allocation section using the first DL-CSI and the second DL-CSI,
   wherein:
   the allocation section allocates the uplink band and the downlink band to one of the bands in which the channel fluctuation is equal to or more than the second threshold value, such that the frequency of the allocated uplink band is the same as the frequency of the first part of the downlink band.

4. A terminal apparatus that communicates with a base station apparatus using a time division duplex scheme in which a downlink bandwidth and an uplink bandwidth are different, the terminal apparatus comprising:
   a channel estimation section that performs channel estimation using a pilot signal transmitted from the base station to obtain downlink channel state information (DL-CSI); and
   a transmission section that feeds back a downlink channel quality indicator (DL-CQI) to the base station apparatus and feeds back the DL-CSI of a partial band to the base station apparatus, when a downlink band and an uplink band are allocated to the terminal apparatus by the base station such that a frequency of the allocated uplink band is the same as a frequency of a first part of the allocated downlink band, and when request information on feeding back the DL-CSI is received from the base station apparatus, the partial band being a second part of the allocated downlink band other than the first part of the allocated downlink band, the request information requesting feedback of the DL-CSI of the second part of the allocated downlink band, and the DL-CQI being equal to or more than a first threshold value of channel quality.

5. A closed loop control method performed by a base station apparatus that communicates with a plurality of terminal apparatuses used in a time division duplex scheme in which a downlink bandwidth and an uplink bandwidth are different, the method comprising:

allocating a downlink band and an uplink band to a specific terminal apparatus in the plurality of terminal apparatuses, such that a frequency band of the allocated uplink band is the same as a frequency of a first part of the allocated downlink band;

receiving a downlink channel quality indicator (DL-CQI) from the specific terminal apparatus, the DL-CQI being equal to or more than a first threshold value of channel quality;

transmitting, to the specific terminal apparatus, request information for requesting feedback of downlink channel state information (DL-CSI) of a second part of the allocated downlink band other than the first part of the downlink band;

receiving DL-CSI of the second part of the downlink band, from the specific terminal apparatuses, the received DL-CSI being used as a second DL-CSI for closed loop control processing;

performing channel estimation using a pilot signal transmitted on the allocated uplink band from the specific terminal apparatus, to estimate uplink channel state information (UL-CSI), the estimated UL-CSI being used as a first DL-CSI for the closed loop control processing; and performing the closed loop control processing for a downlink band allocation using the first DL-CSI and the second DL-CSI.

\* \* \* \* \*